United States Patent
Nowatari

(10) Patent No.: US 10,323,686 B2
(45) Date of Patent: Jun. 18, 2019

(54) RADIAL ROLLER BEARING

(71) Applicant: Shuichi Nowatari, Kanagawa (JP)

(72) Inventor: Shuichi Nowatari, Kanagawa (JP)

( * ) Notice: Subject to any disclaimer, the term of this patent is extended or adjusted under 35 U.S.C. 154(b) by 0 days.

(21) Appl. No.: 15/765,269

(22) PCT Filed: Jul. 4, 2016

(86) PCT No.: PCT/JP2016/069773
§ 371 (c)(1),
(2) Date: Apr. 1, 2018

(87) PCT Pub. No.: WO2017/056615
PCT Pub. Date: Apr. 6, 2017

(65) Prior Publication Data
US 2018/0298945 A1 Oct. 18, 2018

(30) Foreign Application Priority Data
Oct. 1, 2015 (JP) .................................. 2015-195966

(51) Int. Cl.
*F16C 19/26* (2006.01)
*F16C 25/06* (2006.01)
(Continued)

(52) U.S. Cl.
CPC ............ *F16C 25/06* (2013.01); *F16C 19/225* (2013.01); *F16C 33/4652* (2013.01);
(Continued)

(58) Field of Classification Search
CPC ........... F16C 19/26; F16C 23/06; F16C 33/34
See application file for complete search history.

(56) References Cited

U.S. PATENT DOCUMENTS 4,881,828 A 11/1989 Kato
6,176,620 B1 1/2001 Obara
(Continued)

FOREIGN PATENT DOCUMENTS

JP S47-002244 U 8/1972
JP S50-108441 A 8/1975
(Continued)

OTHER PUBLICATIONS

Japanese Office Action for the related Japanese Patent Application No. 2015-195966 dated Dec. 20, 2016.
(Continued)

*Primary Examiner* — Thomas R Hannon
(74) *Attorney, Agent, or Firm* — Kenealy Vaidya LLP

(57) ABSTRACT

A radial roller bearing can include an outer race having as a center axis a first axis extending in a first direction and an inner race having as the center axis the first axis. A group of rollers composed of a plurality of rollers arranged at intervals in the circumferential direction can be centered on the first axis between the outer raceway surface of the outer race and the inner raceway surface of the inner race and a cage can be provided for holding the group of rollers. A first regulating part can be provided for regulating the movement of the outer race to one side. A second regulating part can be provided for regulating the movement of the outer race to another side. The first regulating part and the second regulating part can be arranged at positions at which the distance between the first regulating part and the second regulating part is a prescribed distance longer than the outer race.

4 Claims, 10 Drawing Sheets

(51) Int. Cl.
*F16C 35/063* (2006.01)
*F16C 19/22* (2006.01)
*F16C 33/46* (2006.01)
*F16C 33/49* (2006.01)
*F16C 33/58* (2006.01)
*F16C 33/60* (2006.01)
*F16C 19/28* (2006.01)

(52) U.S. Cl.
CPC .......... *F16C 33/491* (2013.01); *F16C 33/585* (2013.01); *F16C 33/605* (2013.01); *F16C 35/063* (2013.01); *F16C 19/26* (2013.01); *F16C 19/28* (2013.01); *F16C 33/4676* (2013.01); *F16C 2208/30* (2013.01)

(56) References Cited

U.S. PATENT DOCUMENTS

| | | | | |
|---|---|---|---|---|
| 10,047,795 | B2* | 8/2018 | Watanabe | F16C 19/466 |
| 2001/0006566 | A1* | 7/2001 | Akamatsu | F16C 19/46 |
| | | | | 384/559 |
| 2009/0133528 | A1* | 5/2009 | Waseda | F01L 1/047 |
| | | | | 74/567 |
| 2016/0319869 | A1* | 11/2016 | Watanabe | F16C 19/466 |
| 2018/0080497 | A1* | 3/2018 | Fukazu | C08L 79/08 |

FOREIGN PATENT DOCUMENTS

| | | |
|---|---|---|
| JP | S62-049017 A | 3/1987 |
| JP | H01-146013 U | 10/1989 |
| JP | H08-334127 A | 12/1996 |
| JP | H11-247850 A | 9/1999 |
| JP | H11-247851 A | 9/1999 |
| JP | 2000-283169 A | 10/2000 |
| JP | 2005-061483 A | 3/2005 |
| JP | 2005-147301 A | 6/2005 |
| JP | 2005-147364 A | 6/2005 |
| JP | 2009-127808 A | 6/2009 |
| JP | 2009-250412 A | 10/2009 |
| JP | 2009-299819 A | 12/2009 |
| JP | 2010-065821 A | 3/2010 |

OTHER PUBLICATIONS

Japanese Office Action for the related Japanese Patent Application No. 2015-195966 dated Mar. 13, 2018.
International Search Report for PCT/JP2016/069773 dated Sep. 20, 2016.

* cited by examiner

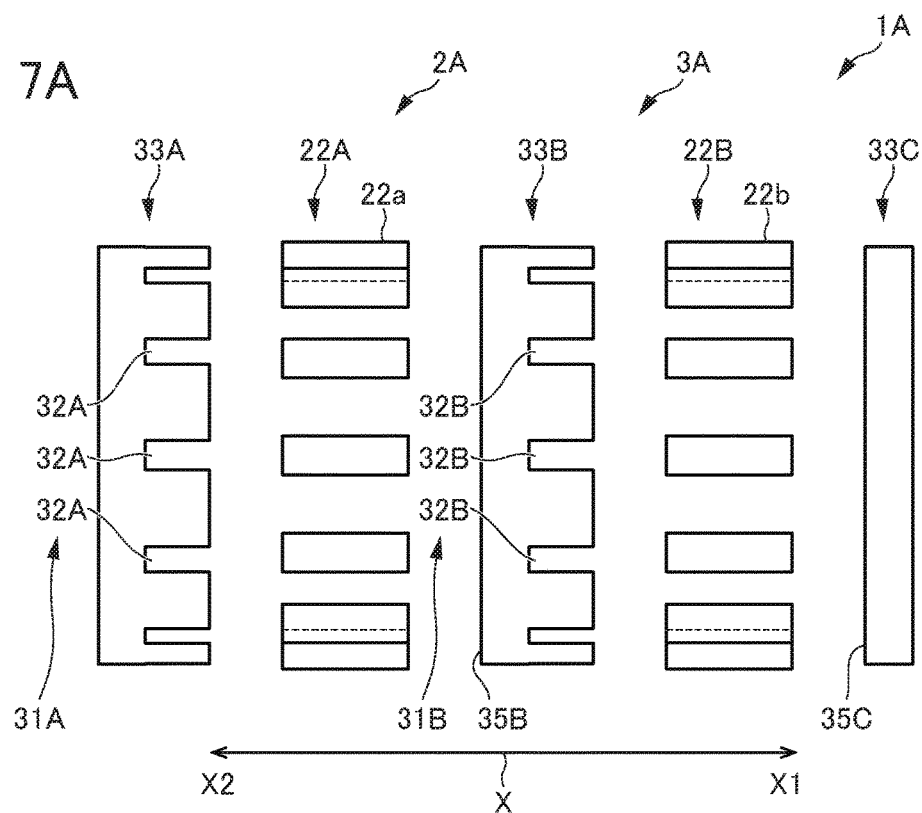
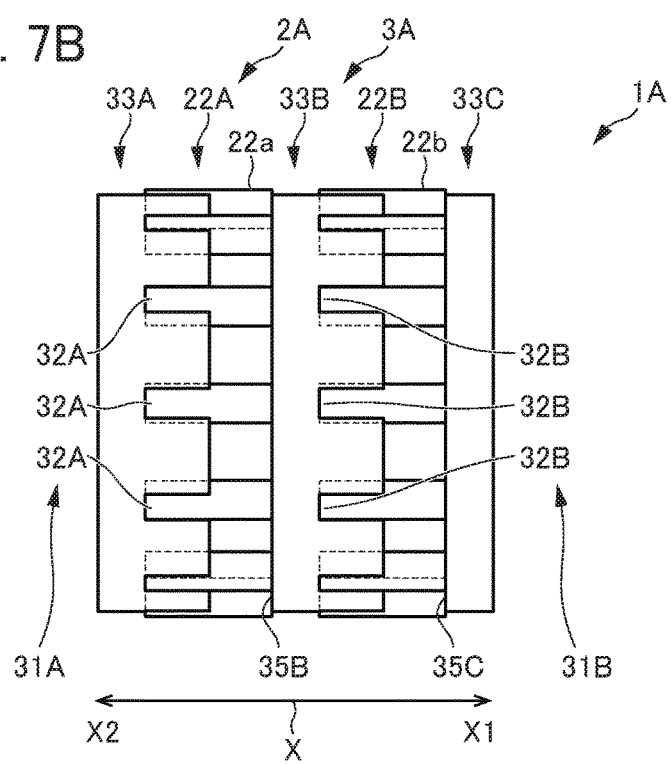

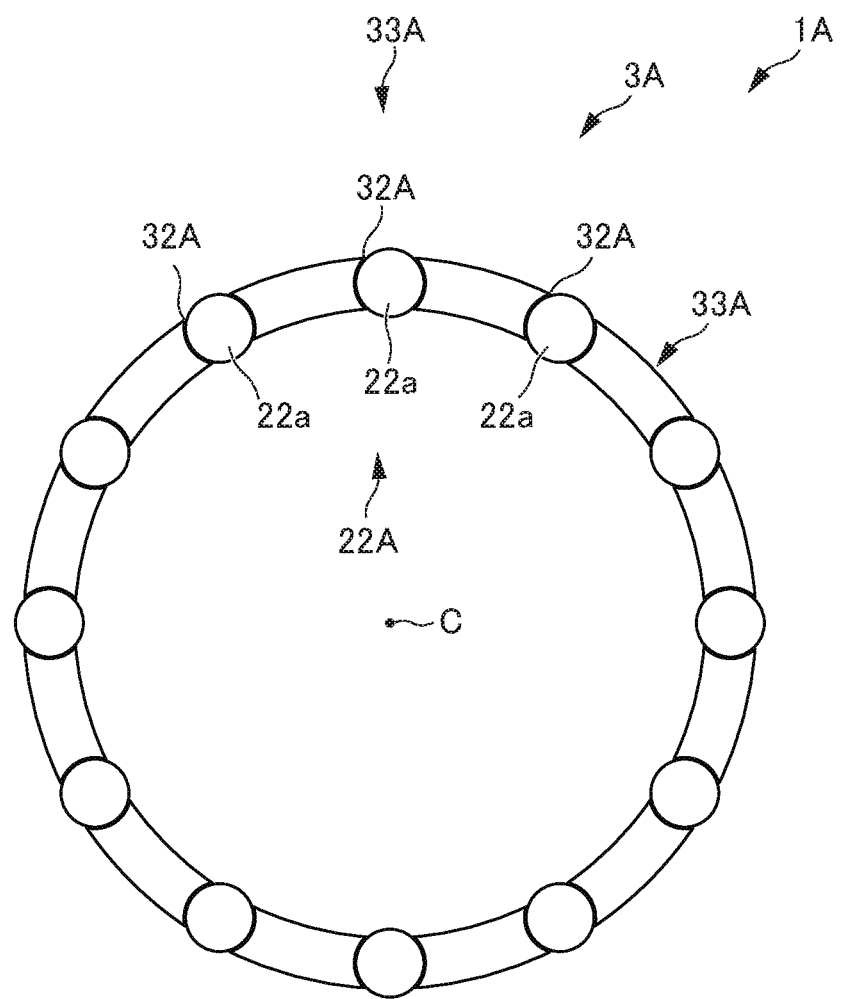

RADIAL ROLLER BEARING

This application is a U.S. national phase filing under 35 U.S.C. § 371 of PCT Application No. PCT/JP2016/069773, filed Jul. 4, 2016, and claims priority under 35 U.S.C. § 119 to Japanese patent application number JP2015-195966 filed on Oct. 1, 2015, the entireties of which are incorporated herein by reference.

TECHNICAL FIELD

The present invention relates to a radial roller bearing.

BACKGROUND ART

Radial roller bearings that employ cylindrical rollers as rolling bodies have greater load capacity and higher stiffness than radial ball bearings. Therefore, the radial roller bearings are excellent for use in rotary support parts to which large loads are applied. A retainer that rollably retains rollers is usually composed of press-molded items obtained by press-machining of metal plates. The material of a metal plate that is employed is, for example, SPCC (JIS-standard cold rolled sheet steel), SPHC (JIS-standard hot rolled sheet steel), SPB1 or SPB2 (BAS-standard (Japan Bearing Industry Association-standard) low carbon sheet steel), or the like. Such radial roller bearings require high dimensional precision.

Inventions have been disclosed that suppress falls in dimensional precision that arise in various processes, through structurally devising retainers (for example, see Patent Document 1).

Patent Document 1: Japanese Unexamined Patent Application, Publication No. 2005-147364

DISCLOSURE OF THE INVENTION

Problems to be Solved by the Invention

There is a problem in that keeping dimensional precision high imposes significant demands on design processes, fabrication processes and quality management processes.

An object of the present invention is to provide a radial roller bearing that is less susceptible to requirements for high dimensional precision.

Means for Solving the Problems

The present invention relates to a radial roller bearing including: an outer race including an outer raceway surface at an inner periphery face thereof, the outer raceway surface having a cylindrical shape whose central axis is a first axis extending in a first direction; an inner race including an inner raceway surface at an outer periphery face thereof, the inner raceway surface having a cylindrical shape whose central axis is the first axis; a roller group composed of plural rollers that are arranged between the outer raceway surface and the inner raceway surface at intervals in a circumferential direction centered on the first axis; a retainer including a pocket group composed of plural pockets, each pocket rollably retaining each roller; a first regulating part that regulates movement of the outer race toward one side in the first direction; and a second regulating part that regulates movement of the outer race toward another side in the first direction, wherein the first regulating part and the second regulating part are disposed at positions where a distance between the first regulating part and the second regulating part is longer than a length of the outer race in the first direction by a prescribed distance.

The prescribed distance may be at least 3% of a length of the retainer in the first direction.

The roller group may include: a first roller group composed of a plurality of the rollers; and a second roller group composed of a plurality of the rollers, the second roller group being disposed at the one side in the first direction of the first roller group, and the retainer may include: a first retaining portion including a first pocket group composed of plural first pockets that are formed such that the plural rollers composing the first roller group are insertable respectively into the first pockets from the one side and such that the rollers do not drop out in directions orthogonal to the first direction, each of the first pockets rollably retaining each roller composing the first roller group in a state in which a portion of each roller at the one side is exposed; and a second retaining portion that is disposed at the one side relative to the first retaining portion and the first roller group, the second retaining portion including a second pocket group composed of plural second pockets that are formed such that the plural rollers composing the second roller group are respectively insertable into the second pockets from the one side and such that the rollers do not drop out in directions orthogonal to the first direction, each of the second pockets rollably retaining each roller composing the second roller group in a state in which a portion of each roller at the one side is exposed, and the second retaining portion regulating movement of the plural rollers composing the first roller group toward the one side.

The pockets may include non-contact portions that do not touch outer periphery faces of the rollers.

Some or all of the rollers, the retainer, the outer race and the inner race may be fabricated of fluoride resin.

Effects of the Invention

According to the present invention, a radial roller bearing that is less susceptible to requirements for high dimensional precision may be provided.

BRIEF DESCRIPTION OF THE DRAWINGS

FIG. 7A is an exploded view of a retainer 3A according to a second embodiment of the present invention.

FIG. 7B is a view illustrating an assembled state of the retainer 3A according to the second embodiment of the present invention.

FIG. 8 is a diagram illustrating a state in which rollers 22a are accommodated in the retainer 3A according to the second embodiment.

PREFERRED MODE FOR CARRYING OUT THE INVENTION

First Embodiment

Figure 1:
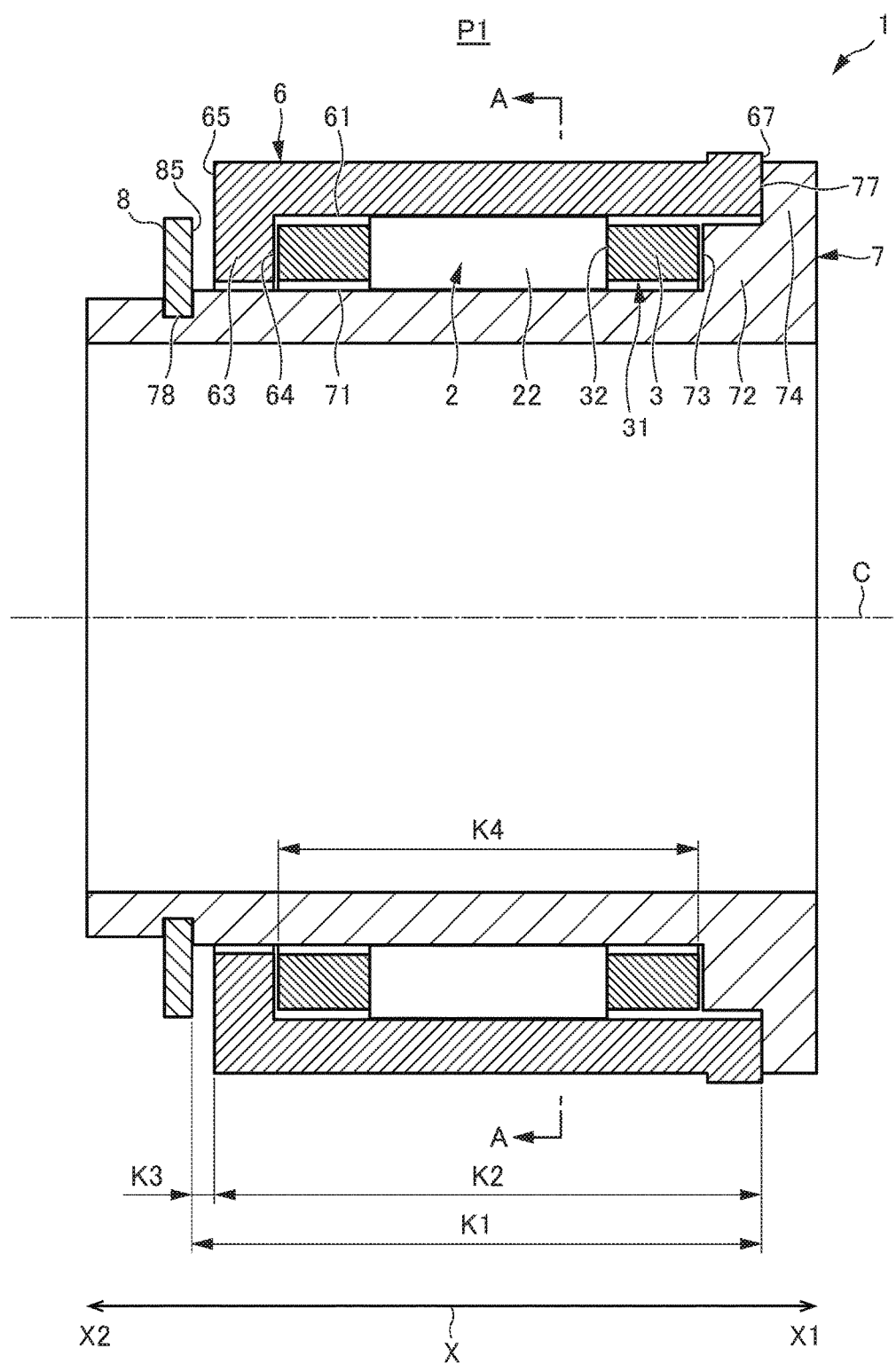
FIG. 1 is a sectional diagram of a first state P1 of a roller bearing 1 according to a first embodiment of the present invention.
Figure 2:
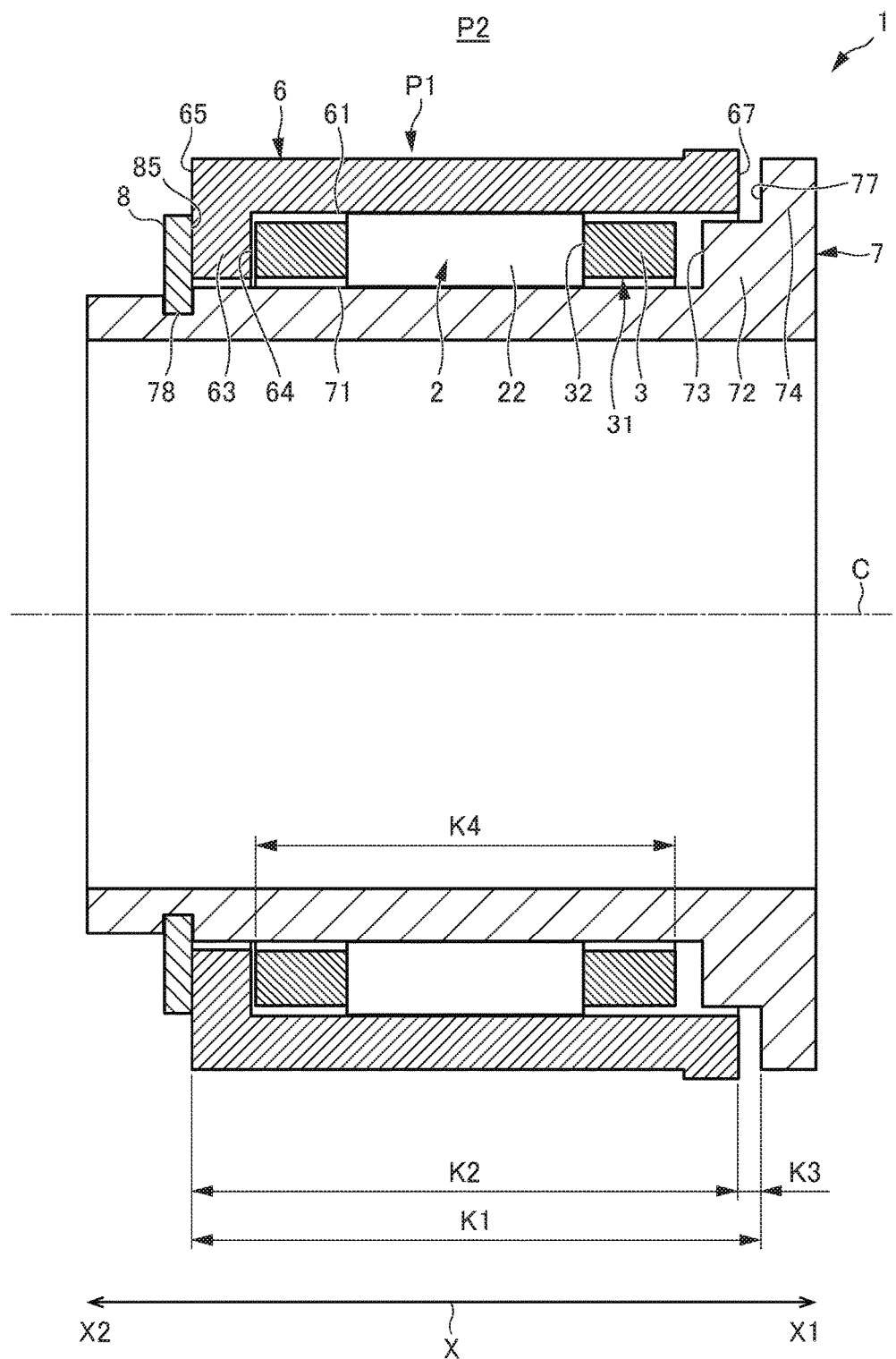
FIG. 2 is a sectional diagram of a second state P2 of the roller bearing 1 according to the first embodiment of the present invention.
Figure 3:
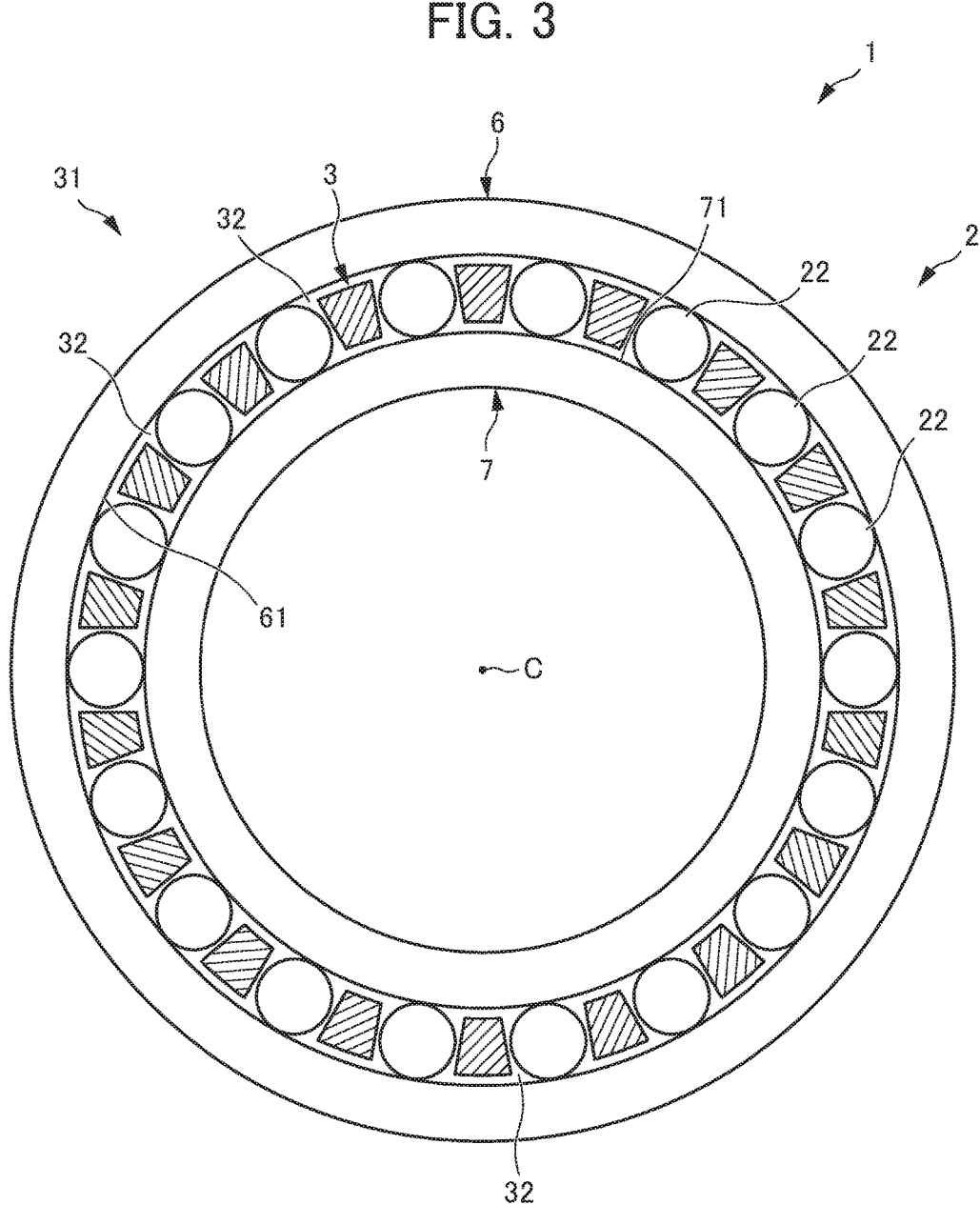
FIG. 3 is a sectional diagram along in FIG. 1.
Figure 4:
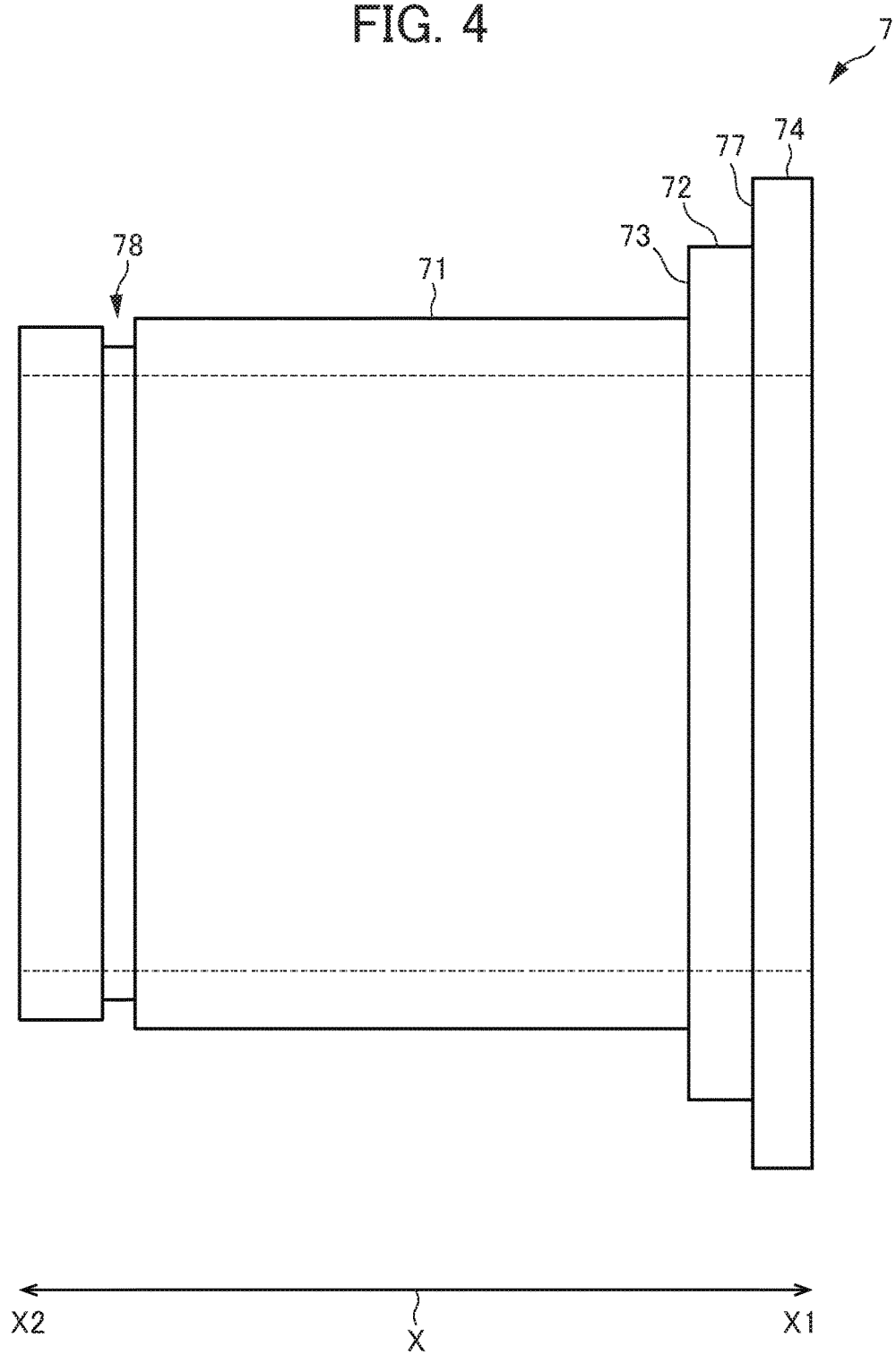
FIG. 4 is a side view of an inner race 7.
Figure 5:
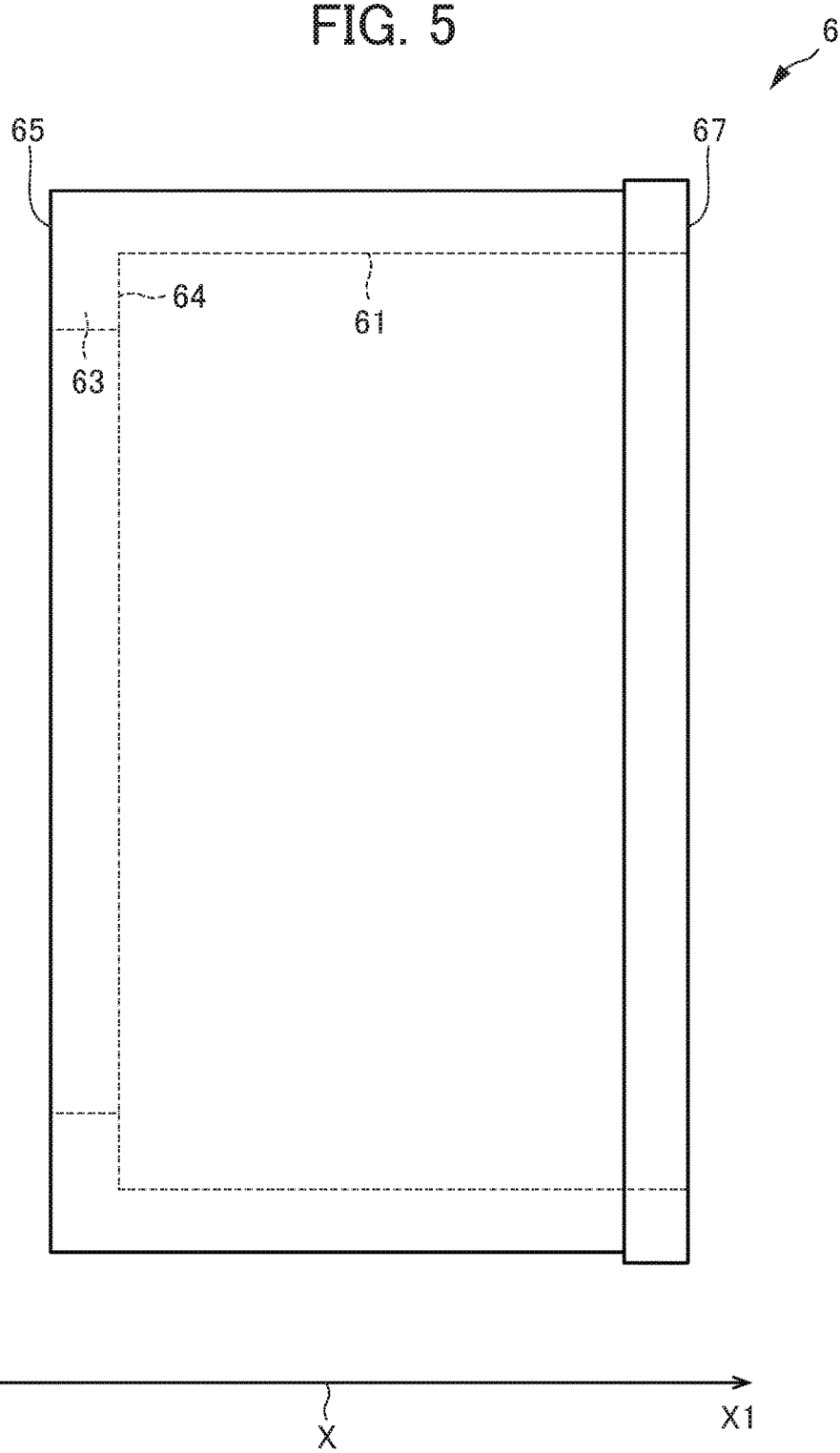
FIG. 5 is a side view of an outer race 6.
Figure 6:
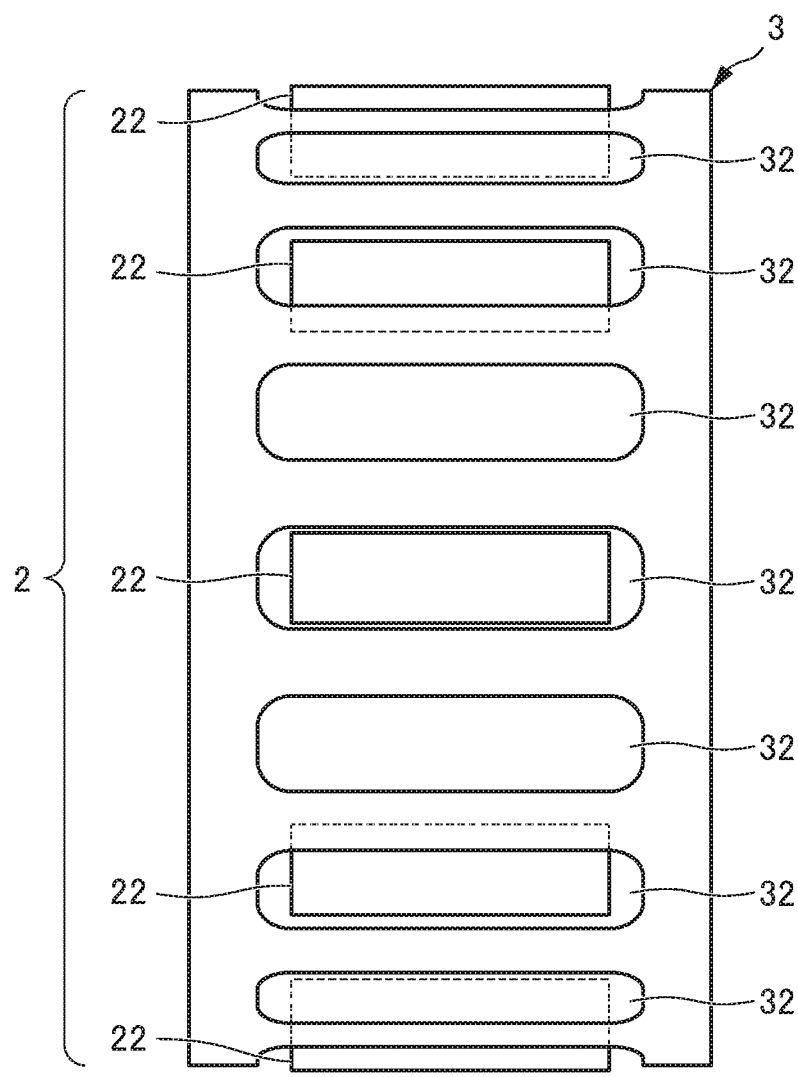
FIG. 6 is a diagram illustrating a retainer 3 in a state in which rollers 22 are accommodated in pockets 32.

A radial roller bearing 1 (below referred to simply as "the roller bearing 1") according to a first embodiment of the present invention will be described with reference to the attached drawings. FIG. 1 is a sectional diagram of a first state P1 of the roller bearing 1 according to the first embodiment of the present invention. FIG. 2 is a sectional diagram of a second state P2 of the roller bearing 1 according to the first embodiment of the present invention. FIG. 3 is a sectional diagram along A-A in FIG. 1. FIG. 4 is a side view of an inner race 7. FIG. 5 is a side view of an outer race 6. FIG. 6 is a diagram illustrating a retainer 3 in a state in which rollers 22 are accommodated in pockets 32.

The radial roller bearing 1 according to the first embodiment is a roller bearing that bears radial loads. As illustrated in FIG. 1 to FIG. 6, the roller bearing 1 according to the first embodiment is provided with a roller group 2, the retainer 3, the outer race 6 that is an outer raceway ring (outer ring), the inner race 7 that is an inner raceway ring (inner ring), and a regulating member 8. The radial roller bearing 1 is used in, for example, a vehicle transmission, a wind turbine or the like.

As illustrated in FIG. 1 to FIG. 3 and FIG. 5, the outer race 6 includes, at an inner periphery face thereof, a cylindrical outer raceway surface 61 whose central axis is a first axis C that extends in a first direction X. The outer raceway surface 61 is a raceway surface on which the plural rollers 22 roll. The outer race 6 is disposed at an exterior of the inner race 7. The first direction X may be a horizontal direction, may be a vertical direction, and may be an inclined direction.

The outer race 6 includes an annular portion 63 at an end portion of the outer race 6 at an X2 side (another side) in the first direction X. The annular portion 63 is formed to project inward in a diametric direction (toward the first axis C) which is orthogonal to the first direction X. The outer race 6 includes a first regulated part 67 formed at an end portion of the outer race 6 at an X1 side (one side) in the first direction X.

The annular portion 63 includes a first retainer regulating part 64 formed at the X1 side (the one side) in the first direction X, and a second regulated part 65 formed at the X2 side. The first retainer regulating part 64 regulates movement of the retainer 3 toward the X2 side in the first direction X. As illustrated in FIG. 2, movement of the second regulated part 65 toward the X2 side in the first direction X is regulated by a second regulating part 85 of the regulating member 8. The second regulating part 85 is described below. That is, movement of the outer race 6 (the second regulated part 65) toward the X2 side in the first direction X is regulated by the regulating member 8 (the second regulating part 85).

As illustrated in FIG. 1, movement of the first regulated part 67 toward the X1 side in the first direction X is regulated by a first regulating part 77 of the inner race 7. The first regulating part 77 is described below. That is, movement of the outer race 6 (the first regulated part 67) toward the X1 side in the first direction X is regulated by the inner race 7 (the first regulating part 77).

As illustrated in FIG. 1 to FIG. 4, the inner race 7 includes, at an outer periphery face thereof, a cylindrical inner raceway surface 71 whose central axis is the first axis C. The inner raceway surface 71 is a raceway surface on which the plural rollers 22 roll. The inner race 7 is disposed at an interior of the outer race 6.

The inner race 7 includes a first collar portion 72 formed at the X1 side of the inner race 7 in the first direction X, and a second collar portion 74 formed adjacent to the first collar portion 72 at the X1 side thereof. The inner race 7 further includes a groove portion 78 formed at the X2 side of the inner race 7 in the first direction X.

The first collar portion 72 is an annular portion formed at the X1 side of the inner race 7 in the first direction X. The first collar portion 72 projects outward in the diametric direction which is orthogonal to the first direction X. The first collar portion 72 includes a second retainer regulating part 73 formed at the X2 side thereof in the first direction X. The second retainer regulating part 73 regulates movement of the retainer 3 toward the X1 side in the first direction X.

The second collar portion 74 is an annular portion formed adjacent to the first collar portion 72 at the X1 side thereof. The second collar portion 74 projects outward in the diametric direction which is orthogonal to the first direction X. The second collar portion 74 includes the first regulating part 77 formed at the X2 side thereof in the first direction X. The first regulating part 77 regulates movement of the outer race 6 toward the X1 side (the one side) in the first direction X. The first regulating part 77 abuts on the first regulated part 67 of the outer race 6 to regulate movement of the outer race 6 toward the X1 side (the one side) in the first direction X. This state corresponds to the first state P1 illustrated in FIG. 1.

The groove portion 78 is formed in an outer periphery portion of the inner race 7 at the X2 side in the first direction X. The groove portion 78 is recessed inward with respect to the diametric direction. The regulating member 8 is engaged with the groove portion 78.

As illustrated in FIG. 1 to FIG. 3, the roller group 2 is composed of the plural rollers 22. Each roller 22 is a cylindrical roller whose outer periphery is in a cylindrical shape. The plural rollers 22 are disposed between the outer raceway surface 61 of the outer race 6 and the inner raceway surface 71 of the inner race 7. The plural rollers 22 are arranged at predetermined intervals in a circumferential direction centered on the first axis C.

The plural rollers 22 composing the roller group 2 are rollably arranged. To be more specific, the plural rollers 22 are rollably accommodated in the pockets 32 formed in the retainer 3. The pockets 32 are described below. Note that some of the rollers 22 are not depicted in the drawing of FIG. 6. In the present embodiment, the rollers 22 are insertable and removable in directions orthogonal to the first direction X (for example, the diametric direction in FIG. 3). Hence, movement of each roller 22 in a direction orthogonal to the first direction X (dropping out) is regulated as a result of being sandwiched in the diametric direction between the outer raceway surface 61 of the outer race 6 and the inner raceway surface 71 of the inner race 7.

As illustrated in FIG. 1 to FIG. 3 and FIG. 6, the retainer 3 is disposed between the outer race 6 and the inner race 7. The retainer 3 is a cylindrical member. Movement of the retainer 3 toward the X2 side in the first direction X is regulated by the first retainer regulating part 64 of the outer race 6, and movement of the retainer 3 toward the X1 side is regulated by the second retainer regulating part 73 of the inner race 7. The retainer 3 rollably retains the plural rollers 22 composing the roller group 2.

The retainer 3 includes a plurally arrayed pocket group 31 that accommodates the rollers 22 composing the roller group 2. The pocket group 31 is composed of the plural pockets 32, which are arranged at predetermined intervals in the circumferential direction centered on the first axis C. Each of the plural pockets 32 rollably retains each roller 22 composing the roller group 2. The retainer 3 may smoothly rotate between the outer raceway surface 61 of the outer race 6 and the inner raceway surface 71 of the inner race 7 with the rollers 22 acting as rotating bodies.

Each of the plural pockets 32 retains each roller 22 in a state in which movement of each roller 22 in the first direction X is regulated. In addition, each of the plural pockets 32 retains each roller 22 to be insertable and removable in a direction which is orthogonal to the first direction X (the direction of the first axis C).

As illustrated in FIG. 1 and FIG. 2, the regulating member 8 is engaged with the inner race 7. To be more specific, the regulating member 8 is engaged with the groove portion 78 formed in the inner race 7 in a state in which movement of the regulating member 8 in the first direction X is regulated.

The regulating member 8 includes the second regulating part 85 formed at the X1 side thereof in the first direction X. The second regulating part 85 abuts on the second regulated part 65 of the outer race 6 and regulates movement of the outer race 6 toward the X2 side (the another side) in the first direction X. This state corresponds to the second state P2 illustrated in FIG. 2.

The regulating member 8 is engaged with the inner race 7 at a position where a distance K1 between the first regulating part 77 and the second regulating part 85 in the first direction X is longer than a length K2 of the outer race 6 in the first direction X by a prescribed distance K3. The roller bearing 1 can be considered to feature looseness in the amount of the prescribed distance K3. Thus, the roller bearing 1 may tolerate dimensional errors pertinent to the outer race 6, the retainer 3 and the rollers 22.

The prescribed distance K3 may be preferably at least 2% of a length K4 of the retainer 3 in the first direction X, and be more preferably at least 3% of the same. That is, the looseness produced by the provision of the prescribed distance K3 is an intentionally (positively) generated looseness, not an unavoidable (passive) looseness resulting from factors such as dimensional precision of components and the like.

The outer race 6 is configured to be movable from the first state P1 illustrated in FIG. 1 to the second state P2 illustrated in FIG. 2. The retainer 3 and the roller group 2 are configured to be movable by the prescribed distance K3 in the first direction X, depending on movement of the outer race 6.

In the present embodiment, the regulating member 8 may be, for example, a C-ring-shaped member fabricated of fluoride resin. Since the regulating member 8 is fabricated of fluoride resin, the production of noise may be suppressed even when the outer race 6 abuts on the regulating member 8. Alternatively, the regulating member 8 may be fabricated of metal.

In the present embodiment, the plural rollers 22, the retainer 3, the outer race 6 and the inner race 7 are fabricated of fluoride resin. Examples of fluoride resin include PTFE, PFA and FEP. Fluoride resins have various excellent characteristics such as chemical resistance, electrical insulation, heat resistance, low friction (self-lubrication), machinability and so forth. Thus, compared to metals and general resins, fluoride resins are suitable for use as rollers of a bearing and the like. It may be that some of the rollers 22, the retainer 3, the outer race 6 and the inner race 7 are fabricated of fluoride resin (for example, the rollers 22 and the retainer 3 may be fabricated of fluoride resin while the outer race 6 and the inner race 7 are fabricated of metal). When all or some of the rollers 22, the retainer 3, the outer race 6 and the inner race 7 are fabricated of fluoride resin, it may be preferable that noises produced in the roller bearing 1 due to the above-mentioned looseness is suppressed.

Resins forming the rollers 22, the retainer 3, the outer race 6 and the inner race 7 may be alternatively resins other than fluoride resins. Further still, the rollers 22, the retainer 3, the outer race 6 and the inner race 7 may be alternatively formed of metal.

According to the first embodiment of the roller bearing 1, for example, the following effects are provided. In the roller bearing 1 according to the first embodiment, the first regulating part 77 and the second regulating part 85 are disposed at positions where the distance between the first regulating part 77 and the second regulating part 85 is longer than the length of the outer race 6 in the first direction X by the prescribed distance K3. Consequently, the roller bearing 1 is less susceptible to requirements for high dimensional precision.

In the roller bearing 1 according to the first embodiment, the prescribed distance K3 may be at least 2%, and preferably at least 3% of the length of the retainer 3 in the first direction X. Therefore, the roller bearing 1 is likely to tolerate dimensional errors. Consequently, the workload during fabrication and the cost burden caused by defective products may be reduced.

In the roller bearing 1 according to the first embodiment, some or all of the rollers 22, the retainer 3, the outer race 6 and the inner race 7 are fabricated of fluoride resin. According to the first embodiment, the rollers 22 may rotate smoothly with respect to the retainer 3, and the rollers 22 may roll smoothly with respect to the outer race 6 and the inner race 7. Consequently, the roller bearing 1 may suppress the production of noise caused by looseness. Further, in contrast to rollers and the like fabricated of metal, rust is not produced at rotating parts. Therefore, in a roller bearing that is provided in emergency equipment or the like, even if the roller bearing is used during an emergency after a long continuous period of disuse, it may be possible for the rollers 22 and the like to roll smoothly.

Second Embodiment

Figure 9A:
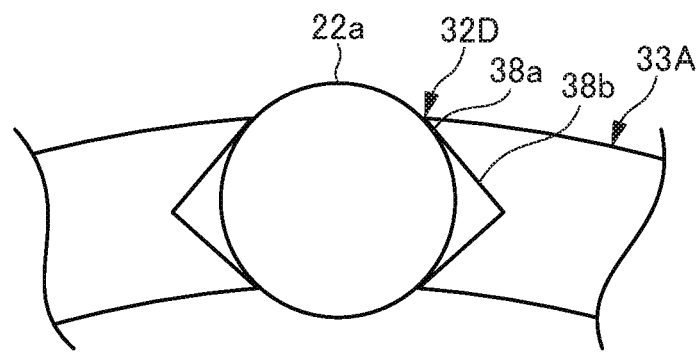
FIG. 9A is a diagram illustrating a first variant example of a pocket according to the second embodiment.
Figure 9B:
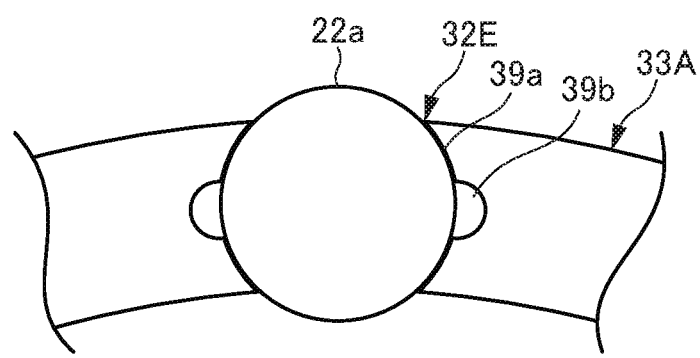
FIG. 9B is a diagram illustrating a second variant example of the pocket according to the second embodiment.

Now, a roller bearing 1A according to a second embodiment will be described with reference to FIG. 7A to FIG. 9B. FIG. 7A is an exploded view of a retainer 3A according to the second embodiment of the present invention. FIG. 7B is a diagram illustrating an assembled state of the retainer 3A according to the second embodiment of the present invention. FIG. 8 is a diagram illustrating a state in which rollers 22a are accommodated in the retainer 3A according to the second embodiment. FIG. 9A is a diagram illustrating a first variant example of a pocket according to the second embodiment, and FIG. 9B is a diagram illustrating a second variant example of the pocket according to the second embodiment. The second embodiment will be principally described focusing on points of difference from the first embodiment. In the second embodiment, the descriptions of the first embodiment may be applied as appropriate to points that are not specifically described. The second embodiment provides similar effects to those of the first embodiment.

As illustrated in FIG. 7A and FIG. 7B, the roller bearing 1A includes a roller group 2A and the retainer 3A. The roller group 2A includes a first roller group 22A and a second roller group 22B. The first roller group 22A is composed of the plural rollers 22a. The second roller group 22B, which is composed of plural rollers 22b, is disposed at an X1 side (one side) of the first roller group 22A in a first direction X.

As illustrated in FIG. 7A and FIG. 7B, the retainer 3A is provided with a first retaining portion 33A, a second retaining portion 33B, and a roller regulating member 33C. As illustrated in FIG. 7A, FIG. 7B and FIG. 8, the first retaining portion 33A includes a first pocket group 31A composed of plural first pockets 32A.

Each of the first pockets 32A composing the first pocket group 31A is formed such that each roller 22a composing the first roller group 22A is insertable from the X1 side (the one side) in the first direction X and such that each roller 22a does not drop out in a direction orthogonal to the first direction X. In a cross section orthogonal to a first axis C, an interior face of each first pocket 32A is formed in a circular arc shape that corresponds with an outer periphery face of each roller 22a (see FIG. 8 in particular). Each of the first pockets 32A composing the first pocket group 31A rollably retains each roller 22a in a state in which a portion of each roller 22a at the X1 side (the one side) is exposed.

As illustrated in FIG. 8, each first pocket 32A is open at thickness-direction openings on both sides with respect to a thickness direction (a diametric direction) of the retainer 3A. In the state in which the rollers 22a are accommodated in the first pockets 32A, each roller 22a protrudes beyond the retainer 3A in the thickness direction of the retainer 3A, through the thickness-direction openings of each first pocket 32A.

Each first pocket 32A regulates disengagement of each roller 22a through the thickness-direction openings of each first pocket 32A. To be more specific, when viewed in a direction in which each first pocket 32A and each roller 22a extend, each thickness-direction opening is narrower than a width (diameter) of each cylindrical roller 22a. Therefore, each roller 22a does not disengage through the thickness-direction openings of each first pocket 32A.

Each first pocket 32A is open at an outer side opening end at the X1 side (the one side) in the first direction X, and closed with a bottom at an X2 side (another side) in the first direction X. Therefore, each roller 22a may be inserted into each first pocket 32A toward the X2 side (the another side) in the first direction X only via the outer side opening end portion, and each roller 22a that has been inserted into each first pocket 32A may be taken out toward the X1 side (the one side) in the first direction X only via the outer side opening end portion. This positional relationship of the outer side opening end portion and the bottom in the first direction X may be alternatively reversed.

As illustrated in FIG. 7A, FIG. 7B and FIG. 8, the second retaining portion 33B is disposed at the X1 side (the one side) relative to the first retaining portion 33A and the first roller group 22A. The second retaining portion 33B has a similar setup to that of the first retaining portion 33A.

The second retaining portion 33B includes a second pocket group 31B composed of plural second pockets 32B. Each of the second pockets 32B composing the second pocket group 31B is formed such that each roller 22b composing the second roller group 22B is insertable from the X1 side (the one side) in the first direction X and such that each roller 22b does not drop out in the direction orthogonal to the first direction X. Shapes of the second pockets 32B are similar to shapes of the first pockets 32A described above. Each of the second pockets 32B composing the second pocket group 31B rollably retains each roller 22b in a state in which a portion of each roller 22b at the X1 side (the one side) is exposed.

The second retaining portion 33B includes a first roller regulating part 35B formed at the X2 side thereof in the first direction X. The first roller regulating part 35B regulates movement of the plural rollers 22a composing the first roller group 22A toward the X1 side (the one side) in the first direction X. In other words, the second retaining portion 33B regulates movement of the plural rollers 22a composing the first roller group 22A that are retained in the first pocket group 31A toward the X1 side (the one side) in the first direction X.

The roller regulating member 33C is a circular plate-shaped member that does not include pockets unlike the first retaining portion 33A and the second retaining portion 33B. The roller regulating member 33C includes a second roller regulating part 35C formed at the X2 side thereof in the first direction X. The second roller regulating part 35C regulates movement of the plural rollers 22b composing the second roller group 22B toward the X1 side (the one side) in the first direction X. In other words, the roller regulating member 33C regulates movement of the plural rollers 22b composing the second roller group 22B, which are retained in the second pocket group 31B, toward the X1 side (the one side) in the first direction X.

A first variant example and a second variant example of the pockets will be described with reference to FIG. 9A and FIG. 9B. The first variant example and second variant example have the feature that each pocket 32A and each pocket 32B, which compose the pocket group 31A and the pocket group 31B respectively, include non-contact portions that do not touch respective outer periphery faces of each roller 22a and each roller 22b composing the roller group 22A and the roller group 22B respectively.

Firstly, the first variant example of the pockets will be described with reference to FIG. 9A. As illustrated in FIG. 9A, a pocket 32D includes a contact portion 38a that touches each roller 22a and a non-contact portion 38b that does not touch each roller 22a.

A middle of the non-contact portion 38b of the first variant example is disposed apart from each roller 22a, the middle lying midway in a thickness direction of the first retaining portion 33A. The non-contact portion 38b is formed in an angled surface shape that approaches each roller 22a towards an exterior and an interior of the first retaining portion 33A. The contact portion 38a is a region with a small area adjacent to the exterior and the interior of the first retaining portion 33A. In the present variant example, each roller 22a is retained in each pocket 32D in a state of point contact or a state close to point contact (in a sectional view).

Next, the second variant example of the pockets will be described with reference to FIG. 9B. As illustrated in FIG. 9B, a pocket 32E includes a contact portion 39a that touches each roller 22a and a non-contact portion 39b that does not touch each roller 22a. A middle of non-contact portion 39b of the second variant example is formed in a recess shape to be away from each roller 22a, the middle lying midway in the thickness direction of the first retaining portion 33A. The contact portion 39a is a region adjacent to an exterior and an interior of the first retaining portion 33A. In the present variant example, each roller 22a is retained in the pocket 32E in a state with a smaller contact area compared with a case in which a non-contact portion is not provided.

According to the second embodiment of the roller bearing 1A, for example, the following effects are provided. In the roller bearing 1A according to the second embodiment, the retainer 3A includes the second retaining portion 33B that regulates movement toward the X1 side (the one side) by the plural rollers 22a composing the first roller group 22A that are retained in the first retaining portion 33A. Therefore, the roller bearing 1A may reduce a number of retainers and a number of components composing a retainer, and enable a reduction in size. Hence, material costs, machining costs and the like may be reduced.

According to the present embodiment, the pockets 32A and 32B composing the pocket groups 31A and 31B rollably retain each of the plural rollers 22a and 22b in a state in which a portion of each roller at the X1 side (the one side) is exposed. Therefore, material costs of the roller bearing 1A may be reduced. Moreover, since the roller bearing 1A is less susceptible to requirements for high dimensional precision, the demands of fabrication may be moderated and fabrication costs may be lowered.

According to the variant examples of the present embodiment, the plural pockets 32A and 32B composing the pocket groups 31A and 31B respectively include non-contact portions that do not touch the respective outer periphery faces of the plural rollers 22a and 22b composing the roller groups 22A and 22B. Therefore, the roller bearing 1A may reduce contact friction caused by the rollers 22a and 22b touching the pockets 32A and 32B.

Third Embodiment

Figure 10:
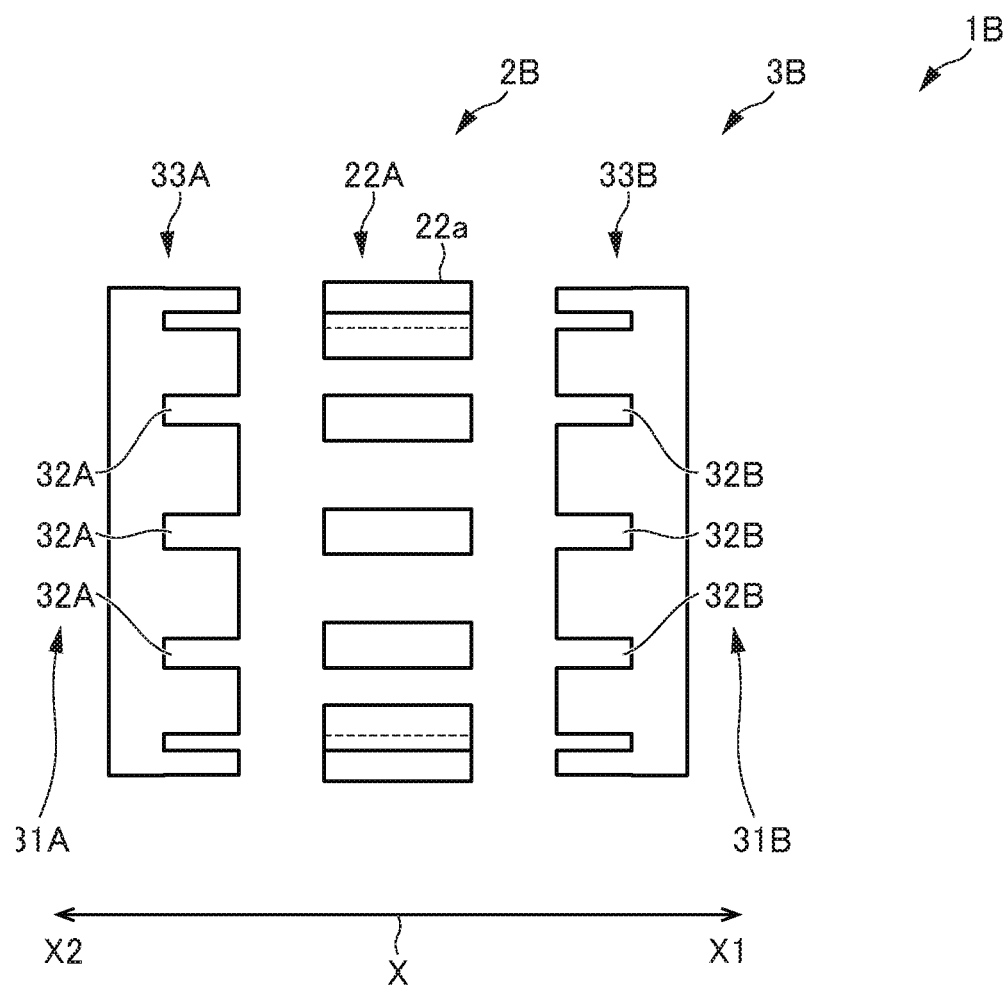
FIG. 10 is an exploded view (corresponding with FIG. 7A) depicting a retainer 3B according to a third embodiment of the present invention.

Now, a roller bearing 1B according to a third embodiment will be described with reference to FIG. 10. FIG. 10 is an exploded view (corresponding with FIG. 7A) depicting a retainer 3B according to the third embodiment of the present invention. The third embodiment will be principally described focusing on points of difference from the second embodiment. In the third embodiment, the descriptions of the second embodiment may be applied as appropriate to points that are not specifically described. The third embodiment provides similar effects to those of the second embodiment. As illustrated in FIG. 10, the roller bearing 1B includes a roller group 2B and a retainer 3B. The roller group 2B is composed of plural rollers 22a.

The retainer 3B is provided with a first retaining portion 33A and a second retaining portion 33B. The first retaining portion 33A includes a first pocket group 31A composed of plural first pockets 32A. Each of the first pockets 32A composing the first pocket group 31A is formed such that each roller 22a composing the roller group 2B is insertable from an X1 side (one side) in a first direction X and such that each roller 22a does not drop out in a direction orthogonal to the first direction X. In a cross section orthogonal to the first axis C, an inner face of each first pocket 32A is formed in a circular arc shape that corresponds with an outer periphery face of each roller 22a. Each first pocket 32A composing the first pocket group 31A rollably retains each roller 22a in a state in which a portion of each roller 22a at the X1 side (the one side) is exposed.

Each of the second pockets 32B composing the second pocket group 31B is formed such that each roller 22a composing the roller group 2B is insertable from an X2 side (another side) in the first direction X and such that each roller 22a does not drop out in the direction orthogonal to the first direction X. In a cross section orthogonal to the first axis C, an inner face of each second pocket 32B is formed in a circular arc shape that corresponds with an outer periphery face of each roller 22a. Each of the second pockets 32B composing the second pocket group 31B rollably retains each roller 22a in a state in which a portion of each roller 22a at the X2 side (the another side) is exposed. In other words, the first pockets 32A of the first retaining portion 33A and the second pockets 32B of the second retaining portion 33B sandwich the plural rollers 22a composing the roller group 2B in the first direction X.

Hereabove, preferable embodiments of the present invention are described. However, the present invention is not limited to the embodiments described above and may be embodied in numerous modes. The first regulating part 77 may be a separate body from the inner race 7 (including modes in which the separate components are linked). The second regulating part 85 may be integrated with the inner race 7. The numbers of roller groups and pocket groups in each embodiment may be three or greater. The numbers of rollers composing the roller groups are not limited. A plural number of rollers arranged in the first axis direction may be accommodated in one pocket.

EXPLANATION OF REFERENCE NUMERALS 1, 1A, 1B (Radial) roller bearing
2, 2A, 2B Roller group
3, 3A, 3B Retainer
6 Outer race
7 Inner race
8 Regulating member
22, 22a, 22b Rollers
31, 31A, 31B Pocket group
32, 32A, 32B Pockets
61 Outer raceway surface
71 Inner raceway surface
77 First regulating part
85 Second regulating part
K1 Distance
K2 Length
K3 Prescribed distance
X First direction

The invention claimed is:

1. A radial roller bearing comprising:
an outer race including an outer raceway surface at an inner periphery face thereof, the outer raceway surface having a cylindrical shape whose central axis is a first axis extending in a first direction;
an inner race including an inner raceway surface at an outer periphery face thereof, the inner raceway surface having a cylindrical shape whose central axis is the first axis;
a roller group composed of a plurality of rollers that are arranged between the outer raceway surface and the inner raceway surface at intervals in a circumferential direction centered on the first axis;
a retainer including a pocket group composed of a plurality of pockets, each pocket rollably retaining each roller composing the roller group;
a first regulating part that regulates movement of the outer race toward one side in the first direction; and
a second regulating part that regulates movement of the outer race toward another side in the first direction,
wherein movement of the retainer toward the first direction is regulated by a first retainer regulating part of the outer race and a second retainer regulating part of the inner race,
wherein the first regulating part and the second regulating part are disposed at positions where a distance between the first regulating part and the second regulating part is longer than a length of the outer race in the first direction by at least 2% or more of a length of the retainer in the first direction,
wherein the rollers and the retainer are fabricated of resin, and wherein the pockets retain the rollers in a state in which movement of the rollers in the first direction is regulated, and the rollers are insertable and removable in a direction orthogonal to the first direction.

2. The radial roller bearing according to claim 1, wherein the first regulating part and the second regulating part are disposed at positions where a distance between the first regulating part and the second regulating part is longer than a length of the outer race in the first direction by 3% or more of a length of the retainer in the first direction.

3. The radial roller bearing according to claim 2, wherein some or all of the rollers, the retainer, the outer race and the inner race are fabricated of fluoride resin.

4. The radial roller bearing according to claim 1, wherein some or all of the rollers, the retainer, the outer race and the inner race are fabricated of fluoride resin.

* * * * *